Sept. 26, 1939.  M. L. GREEN  2,173,879

BITE RIM FORMER

Filed Sept. 29, 1938

INVENTOR:
Maurice L. Green
BY David E. Carlsen
ATTORNEY.

Patented Sept. 26, 1939

2,173,879

UNITED STATES PATENT OFFICE 2,173,879

BITE RIM FORMER

Maurice L. Green, St. Paul, Minn.

Application September 29, 1938, Serial No. 232,333

5 Claims. (Cl. 18—5.7)

My invention relates to a bite-rim forming device for dental use and the main object is to provide a simple, highly efficient and inexpensive device for the purpose stated.

Bite-rims made of various kinds of plastic materials are well known in the art and I have devised means for forming of same in a dual mold as will hereinafter be fully set forth reference being had to the accompanying drawing in which.

Figure 1:
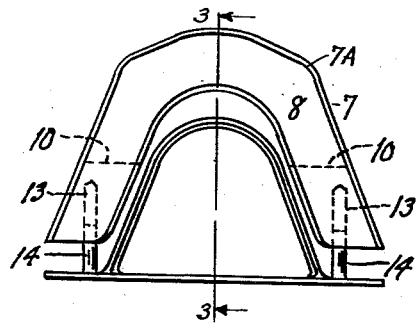
Fig. 1 is a top view of my bite-rim former in one form and its two parts slightly separated.

Referring to the drawing by reference numerals, like characters designating corresponding parts in the various views, my device is a double plane bite-rim former embodying two features for shaping bite-rims, said device comprising an outer mold member 7 of tapered and inverted U shape, the outer wall of which is in vertical plane and its upper edge 7A in horizontal plane. Below said edge 7A is suitably integrally fixed an inwardly directed ledge 8 in horizontal and parallel to edge 7A and of predetermined uniform width. At the under side of said ledge is another ledge 9 extending from the closed forward end and flaring outwardly and downwardly in a predetermined curvature conforming to the so called "curve of Spee" present in every human mouth. This ledge 9 is also directed inwardly from the inner wall of the outer mold member and is of suitable width preferably the same as ledge 8 but may be slightly wider as in Figs. 1-4 inclusive.

The lower edge of mold member 7, designated 7B, is in a curvature parallel to ledge 9, or vice-versa.

Thus the outer mold of my device is formed, and is somewhat of a shape resembling a horse-shoe, the front end closed, the vertical wall flared rearwardly therefrom and the ledges projecting inwardly, one parallel to each of the upper and lower edges of the main mold member. Therefore at the open rear end of the main mold the ledges are spaced apart vertically, said spaces being filled each by a fixed block 10 with a rear face in common, vertical plane, with the rear end of the main or outer mold member.

I provide further a secondary or rear mold member to close the rear end of the main mold. This comprises a plate metal wall piece 11 of a height corresponding to the height of the rear ends of the main member 7 and width to cover same when the rear member is inserted in the main member. Central of the wall piece 11 is provided an integral forwardly directed and tapered sheet metal piece 12 of tapered U shape looking downwardly upon it and of a size to contact the inner edges of the ledges 8—9 simultaneously as the piece 11 is pressed into contact with the rear edges thereof (see Fig. 4). Thus within wall 7 and between it and the walls of piece 12 is formed simultaneously two U shaped channels closed at the ends, one channel in straight plane and one in a curved plane as shown.

Figures 2, 3:
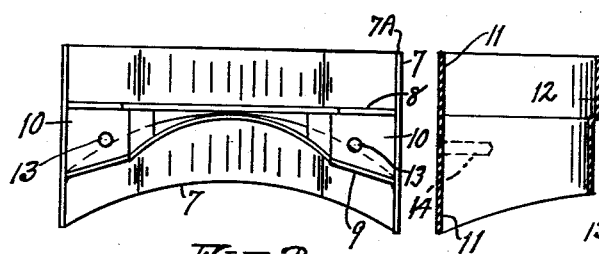
Fig. 2 is a rear view of the outer member of the device in Fig. 1
Fig. 3 is a longitudinal section as on line 3—3 in Fig. 1 but with the two sections completely separated.
Figure 4:
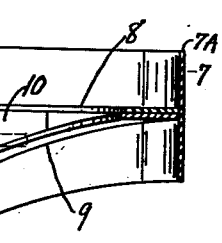
Fig. 4 is a top view of the bite-rim former closed and as used for making bite-rims.

The two mold sections are of course easily seperable but to provide positive closing and holding of them in proper relation to each other while plastic material (bite-rims) are formed in the said channels, I provide in each block 10 a bore 13 each slidably engaged by a fixed pin 14 in rear plate 11 and directed forewardly, said pins comprising each a dowel (see Figs. 1-3 incl.).

Figure 5:
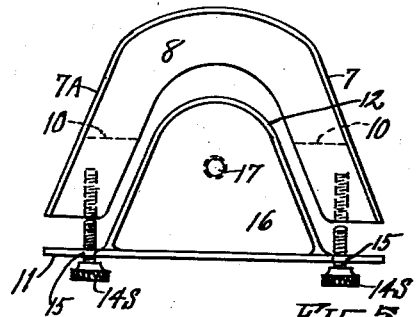
Fig. 5 is a modification of Fig. 1
Figure 6:
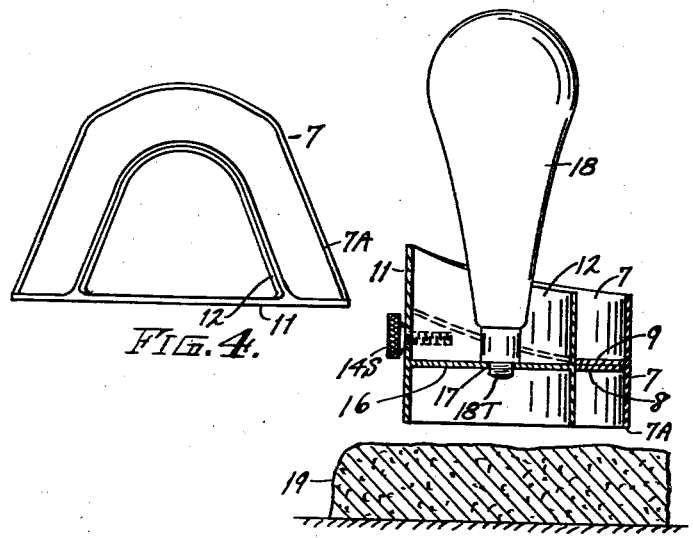
Fig. 6 is a longitudinal section of Fig. 5, corresponding to Fig. 3, but showing the bite-rim inverted relative to Fig. 3, but a handle is added.

In the modified form in Figs. 5 and 6 the bore 13 is threaded and in place of a dowel 14 a shoulder screw 14S is passed forwardly through corresponding apertures 15 in plate 11 to engage and be threaded in bores 13 and hold the two sections firmly together. In this modified form the rear member is formed with a horizontal web 16 intermediate its upper and lower edges, said web having a threaded hole 17 engaged by a correspondingly threaded lower end 18T of a handle 18. The handle can be engaged in said hole if the web from either side and the device can thus be used as a stamp to be pressed down on and into a quantity of plastic rim material 19 as in Fig. 6, in the fashion of a cooky cutter pressed into a batch of dough. Upon raising the device out of the material, all surplus of the latter outwardly of the outer edge of the mold is removed with a knife or other suitable implement, leaving within the mold a properly formed (either straight or concaved) bite-rim such as used by dentists and well known in the art.

In the use of my device as illustrated in Figs. 1-4 the two sections are merely held together by hand and the channels are filled with the plastic material and trimmed off even with either or both edges. Obviously the two kinds of rims can be made with this form of the device before separating the sections and removing the finished bite-rims. In dental practice such rims are usually about ⅜" to ½" or more in width, in cross section, and about 7/16" to ½" deep (or high). The latter described type of bite-rims are preferably molded by first preparing a roll of any suitable wax or plastic material or modeling compound about one inch thick and 4 inches long and laying it in the channel and filling the latter. Then the device with the material in the channel is chilled slightly and surplus material projecting outwardly of the edges is trimmed off after which the form is ready for use.

Modifications may be made within the scope of my invention as disclosed in the above specification and the following claims.

I claim:

1. A dental bite-rim former comprising an outer main member of tapered U form in horizontal contour, a secondary smaller member comprising a plate normally closing the open end of said main member and a forward projection with upright wall, on the latter contacting the inner parts of said main member simultaneously as the plate thereof contacts the open end, said outer member comprising an exterior plate metal wall, with one edge straight and the opposite edge curved to widen both sides alike to the open end, a ledge projecting integrally and inwardly from said wall in spaced parallel relation to each edge to form an outwardly open channel one exposed upwardly and one downwardly.

2. The structure specified in claim 1 and a pair of fixed dowels in the secondary member projecting forwardly in common direction with its projection and means at the open end parts of the main section removably engaged by said dowels for aligning and contacting the two sections, as described.

3. A bite-rim former comprising an outer U shaped member, ledge means parallel to the outer walls of said member and projecting inwardly to predetermined uniform width, a secondary member comprising a plate of a size to close the open end of the main member, a central forwardly directed projection integral of said plate with vertical walls and of a horizontal contour to contact the inner parts or edge parts of said ledge means simultaneously as the said plate closes the open end of the main member to form simultaneously an upper and a lower shallow U shaped channel for molding plastic material therein, and means for drawing said members together in the closed position.

4. The structure specified in claim 3, in which said latter means comprises at the rear end of each arm of the main member the provision of a threaded aperture, a shoulder screw insertible forwardly through the plate of the secondary member and engageable with each said threaded aperture as shown and described.

5. The structure specified in claim 3, and a horizontal web in said secondary member intermediate its top and bottom edges and provided with an aperture, a hand-hold removably retained in said aperture and selectively in upright rigid position relative to either side of said web, as shown and described.

MAURICE L. GREEN.